May 12, 1931. W. S. BUNKER ET AL 1,805,326
BELT DRIVE
Filed May 20, 1927  3 Sheets-Sheet 1

Inventors
William Sylvester Bunker
Geoffrey Leonard Hanscom

By
Attorneys

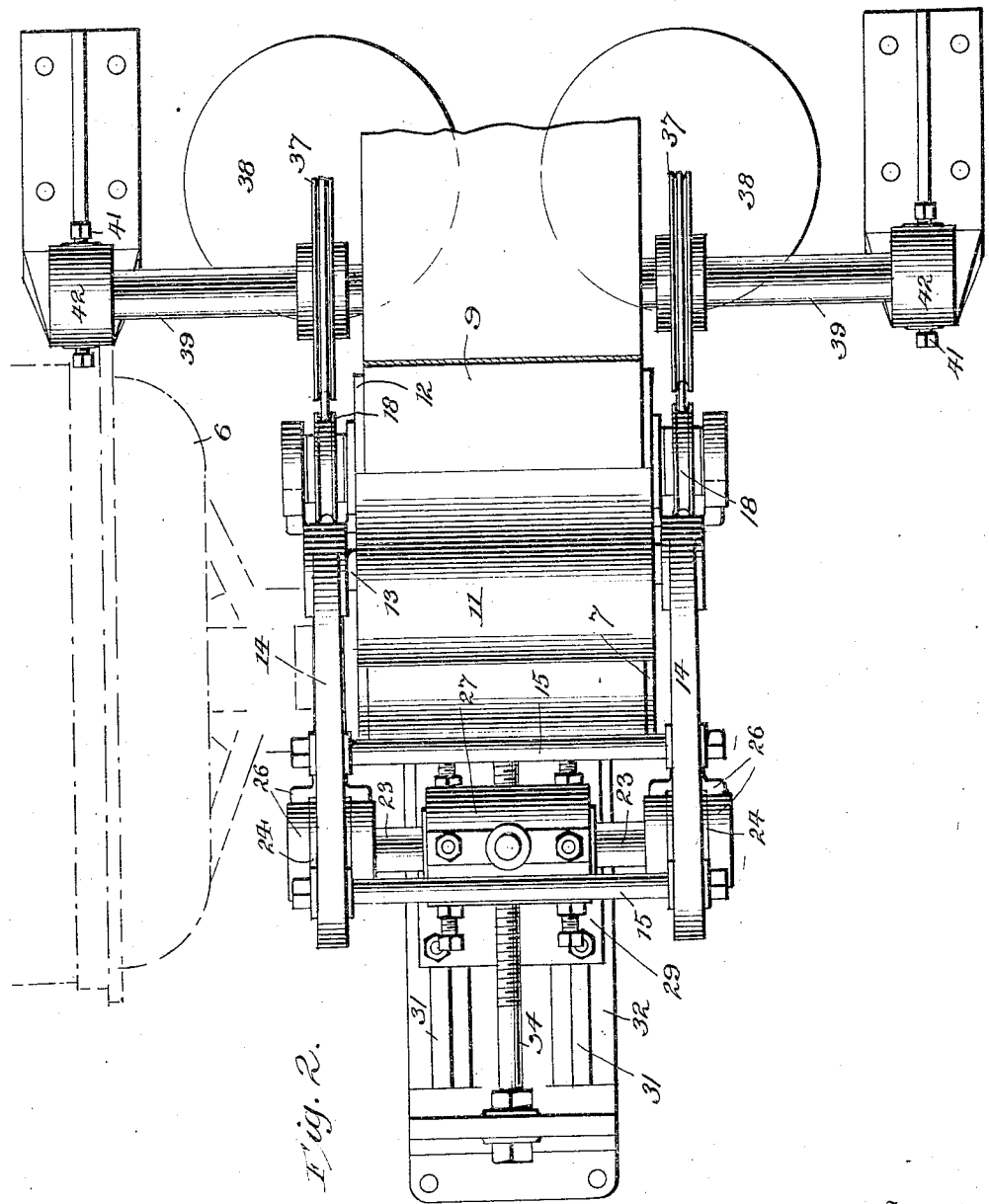

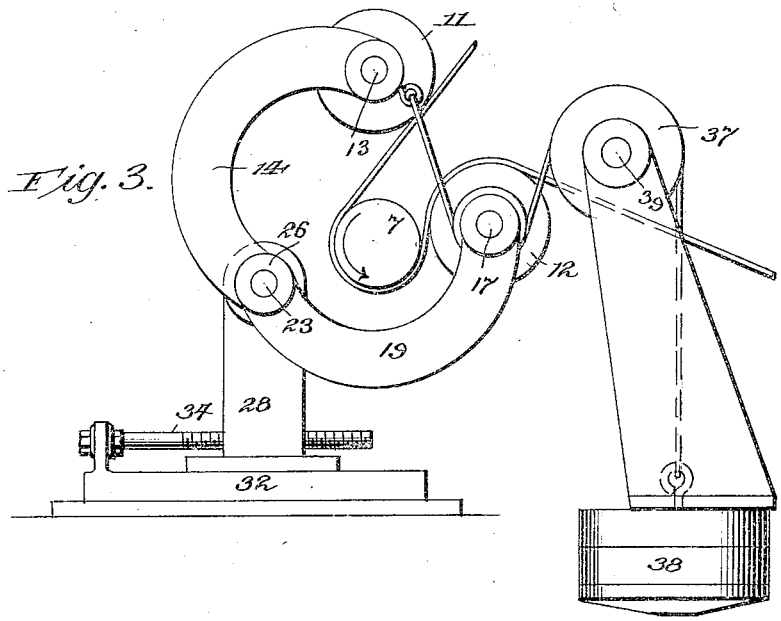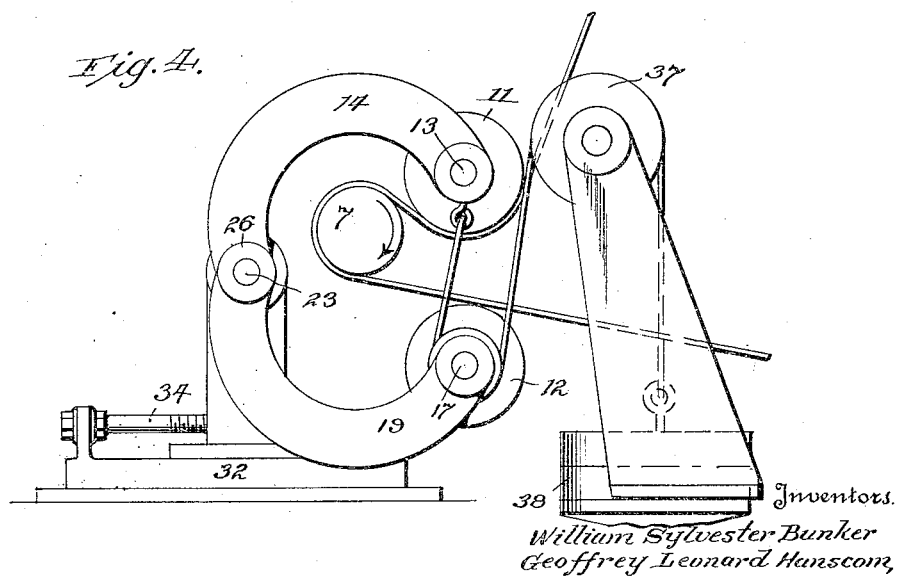

Patented May 12, 1931

1,805,326

UNITED STATES PATENT OFFICE

WILLIAM SYLVESTER BUNKER, OF FOXBORO, AND GEOFFREY LEONARD HANSCOM, OF SOUTH WALPOLE, MASSACHUSETTS, ASSIGNORS TO BIRD MACHINE COMPANY, OF SOUTH WALPOLE, MASSACHUSETTS, A CORPORATION OF MASSACHUSETTS

BELT DRIVE

Application filed May 20, 1927. Serial No. 193,023.

This invention relates to belt drives and particularly to short center drives in which a tension pulley takes up the slack on the slack side of the belt, and at the same time increases the arc of contact of the belt which both pulleys and particularly with the smaller pulley.

The object of the present invention is to produce a drive of such character in which this result is automatically accomplished regardless of the direction of travel of the belt and the direction of force transmission, so that either or both may be reversed at will. A further object of this invention is to provide such a drive wherein a substantially constant and predetermined tension may be applied to the slack side of said belt regardless of variations in load, and reversals of direction of travel of the belt or of power transmission. In addition, variations in length or stretch of belt due to service or use are also taken care of as well as temporary variations in length or stretch due to starting or fluctuations in load, or changes in atmospheric conditions.

To accomplish this, use is made of two tension pulleys, one acting on a face of each run of the belt preferably adjacent the smaller main pulley. These pulleys are independently movable and each is urged inwardly at all times so that they tend to approach each other and thereby apply tension to the belt. If either be forced back by the tightening of the corresponding belt run, the other moves in and takes up the resulting slack in the opposite side and applies a predetermined tension.

A practical embodiment of the invention is illustrated in the accompanying drawings, in which Fig. 1 is a side elevation of the device when the belt is at rest and both runs of the belt are slack.

Fig. 2 is a plan of the parts shown in Fig. 1.

Figs. 3 and 4 are elevation diagrams showing the positions assumed during forward and reverse directions of running.

Figure 1:
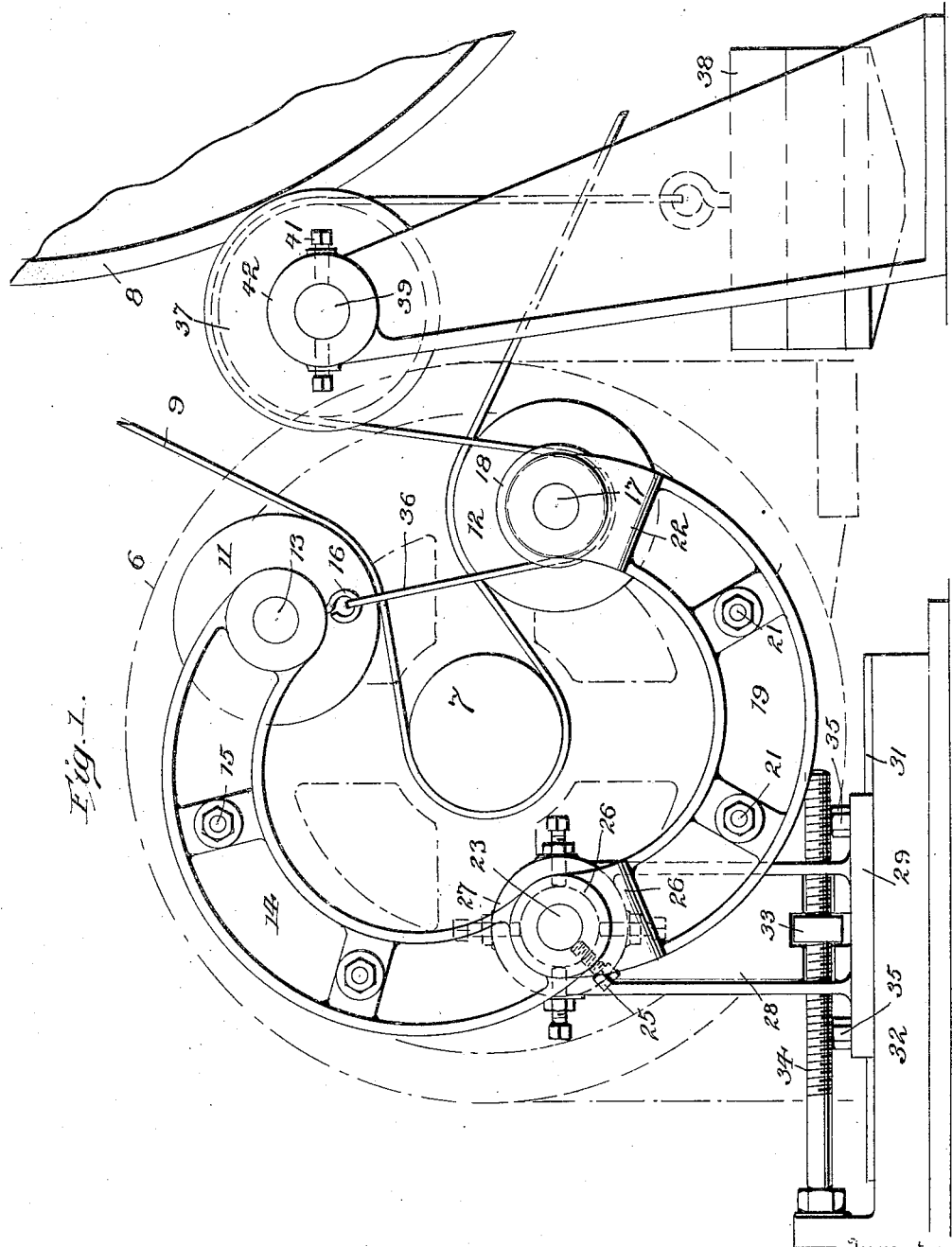

In the drawings, 6 represents an electric motor carrying a driving pulley 7. The larger driven pulley is shown in part at 8 while the driving belt running on these pulleys appears at 9. This belt is tensioned by tension pulleys which are preferably located adjacent the smaller driving pulley and act on opposite runs of the belt, being effective in alternation with each other to take up the slack of the belt and maintain a sufficient arc of contact between the belt and the small driving pulley, which could not be maintained without the tenison pulleys except by widely separating the driving from the driven pulley.

One tension pulley is shown at 11 and the other at 12. The pulley 11 is free to rotate on a journal pin 13 mounted at its ends in a frame made up of arcuate yokes 14 and crossbars 15. Each yoke 14 carries an eye 16 for the attachment of a cable.

The tension pulley 12 is mounted freely on a journal pin 17, longer than the pin 13 so as to give space for two grooved sheaves 18, one at each end of pulley 12. These sheaves are also mounted freely on journal pin 17. To give space for the sheaves the arcuate yokes 19, which with cross bars 21 make up a supporting frame for the pulley 12, are offset as indicated at 22.

The yokes 14 and 19 are mounted on shaft 23, the yoke 14 having a hub 24 which is locked to the shaft 23 by a set-screw 25, and yoke 19 having a bifurcated hub 26 which straddles hub 24 and swivels on shaft 23.

The shaft 23 swivels in a box 27 of known form, mounted on a pedestal 28. The pedestal 28 is carried on a base 29 which is adjustable on ways 31 formed on bed plate 32. The adjustment carries the tension pulleys 11 and 12 toward or away from the driving pulley 7 and is effected by turning nut 33 threaded on the fixed rod 34 and confined in a slot in pedestal 28. After the adjustment is effected the hold-down bolts 35 are tightened, locking base 29 to bed-plate 32.

Attached to the eyes 16 are cables 36, which extend thence downward, pass under sheaves 18 and thence upward and over sheaves 37. To the ends of cables 36 tension weights 38 are attached. The sheaves 37 are swiveled on a cross-shaft 39 fixed by set screws 41 in brackets 42.

The weight applied will be so chosen and the parts so located as to produce the desired degree of pressure upon the slack side of the belt. Any required degree of pressure can be produced by selecting weights and locating the operating parts in accordance with well known principles of mechanics.

In operation one run of the belt is under proper tension in one direction of rotation and the other in the opposite direction. This tension run straightens out until the tendency of the pulley to move inward balances the opposing push of the belt. At the same time the other pulley moves inward and takes up the resulting slack. The belt tension is limited at all times to that exerted by weights 38 modified by the weights of the pulleys and their supporting frames.

By this means there is automatically maintained any desired degree of tension on the slack side of the belt regardless of belt stretch and of variations in the tension of the tight strand of the belt according to load conditions, and regardless of the direction of travel of the belt. Thus, regardless of reversals of belt travel and of changes in belt tension the slack in the belt is automatically taken up and a greater arc of contact between the belt and the adjacent driving pulley is maintained than would be possible without the use of the tension pulleys.

By the use of this invention it is possible to use a short center drive, with resultant economies in power, belt length and floor space, in cases where the work is of such a nature as to require reversals of direction of belt drive.

While we prefer to use such weights as will cause an equal pressure to be applied to the slack side of the belt regardless of the direction of belt travel, in some cases this is not necessary, as, for instance, in cases where the load on the belt traveling in one direction is less than the load on the belt when traveling in the opposite direction. By a proper choice and location of weights any desired pressure can be applied to either side of the belt when that side is the slack side.

We have thus disclosed a device in which a predetermined degree of pressure will be applied to the slack side or strand of the belt when it is running in one direction irrespective of variations in load and force transmission, and automatically, upon reversal of the belt, a predetermined pressure (though not necessarily the same pressure) is applied to the other (now slack) strand of the belt irrespective of variations in load and force transmission.

The device may be used with pulleys of any diameter and belts of any width, and either or both the driving and driven pulleys may be large pulleys of the same diameter, also, the pulleys may be in any one of various relative positions. The driving and driven pulleys may be far apart or may be so close together that there is just room to clear the constant tension rollers.

What is claimed is:—

1. In combination, a pair of pulleys and a belt adapted to run on said pulleys in either direction, two tension pulleys engaging opposite runs of said belt, and yielding means connecting said tension pulleys including a flexible connecting member permitting independent motion of each pulley, and a weight for stressing said member.

2. In combination, a pair of different sized pulleys and a belt adapted to run on said pulleys in either direction, two independently shiftable tension pulleys engaging opposite runs of said belt, and means including a flexible connector and an associated weight reacting between said tension pulleys to press the same against said belt, whereby, when the belt is running in one direction, one of said tension pulleys, pressing against the slack side of said belt, takes up the slack therein and increases the arc of contact between the said belt and the smaller of said first mentioned pulleys, and, upon reversal of the direction of travel of said belt, the other of said tension pulleys automatically operates to perform the like function on the other run of said belt, now become the slack side thereof.

3. In combination, a pair of pulleys and a belt adapted to run on said pulleys in either direction, two independently movable tension pulleys engaging opposite runs of said belt, and means for developing a force reaction between said tension pulleys, while permitting independent movement thereof, said means including a cable reacting between said guide pulleys and a weight for tensioning said cable.

4. In combination, a pair of pulleys and a belt adapted to run on said pulleys in either direction, two tension pulleys engaging opposite runs of said belt, a flexible tension member reacting between said tension pulleys and serving to urge them toward each other; and a weight connected with said tension member to stress the same, to urge the pulleys toward each other and sustain the weight of one pulley.

5. The combination with a pair of pulleys and a slack driving belt running thereon, of a belt tensioning device comprising a pair of tension pulleys, one engaging the outer face of each run of the belt adjacent one of the first named pulleys; means for supporting and guiding said tension pulleys in independent movements toward and from each other; flexible connections for applying a force reacting directly between said tension pulleys to urge the same toward each other; and a weight applied to said connections and serving to exert said force.

6. The combination with a pair of pulleys and a slack driving belt running thereon, of a belt tensioning device comprising an upper tension pulley and a lower tension pulley, one engaging the outer face of the upper and the other the outer face of the lower run of said belt adjacent one of the first named pulleys mounted for independent movements toward and from each other, the weight of the upper pulley and its guiding means acting in a belt tightening direction, and the weight of the lower pulley and its guiding means acting in a belt slackening direction; a cable arranged to act in tension between said tension pulleys to urge the same toward each other; and a weight arranged to stress said cable.

7. The combination with a pair of pulleys and a slack driving belt running thereon, of a belt tensioning device comprising a pair of tenson pulleys, one engaging the outer face of each run of the belt adjacent one of the first-named pulleys; means for supporting and guiding said tension pulleys in independent movements toward and from each other; a guide sheave on one of said guiding and supporting means; a rigidly supported guide sheave; a cable connected with the other guiding and supporting means and passing over said sheaves in the order named; and tensioning means applied to said cable.

8. The combination with a pair of pulleys and a slack driving belt running thereon, of a belt tensioning device comprising an upper tension pulley and a lower tension pulley, one engaging the outer face of the upper and the other the outer face of the lower run of said belt adjacent one of the first named pulleys; means for supporting and guiding said tension pulleys for independent movements toward and from each other, the weight of the upper pulley and its guiding means acting in a belt tightening direction, and the weight of the lower pulley and its guiding means acting in a belt slackening direction; a guide sheave on the lower of said guiding and supporting means; a fixed guide sheave mounted substantially above the same; a cable fixed to the upper of said guiding and supporting means, passing thence downward, around the first named guide sheave; thence upward, and over the second named guide sheave; and a weight attached to said cable and acting to tension the same.

9. The combination with a pair of pulleys and a slack driving belt running thereon, of a belt-tensioning device comprising an upper tension pulley and a lower tension pulley, one engaging the outer face of the upper and the other the outer face of the lower run of said belt adjacent one of the first named pulleys; means for supporting and guiding said tension pulleys for independent movements toward and from each other, the weight of the upper pulley and its guiding means acting in a belt tightening direction, and the weight of the lower pulley and its guiding means acting in a belt slackening direction; a guide sheave on the lower of said guiding and supporting means; a fixed guide sheave mounted substantially above the same; a cable fixed to the upper of said guiding and supporting means, passing thence downward, around the first named guide sheave, thence upward, and over the second named guide sheave; and tensioning means applied to said cable.

10. The combination with a pair of pulleys and a slack driving belt running thereon, of a belt tensioning device comprising a pair of tension pulleys, one engaging the outer face of each run of the belt adjacent one of the first-named pulleys; means for supporting and guiding said tension pulleys in independent movements toward and from each other; a guide sheave on one of said guiding and supporting means; a yielding load applying means; and a cable connected at one end with said load applying means guided by said guide sheave, and connected at its other end with the other of said guiding and supporting means.

11. The combination with a pair of pulleys and a slack driving belt running thereon, of a belt tensioning device comprising a pair of tension pulleys, one engaging the outer face of each run of the belt adjacent one of the first named pulleys; means for supporting and guiding said tension pulleys in independent movements toward and from each other; connections for applying a force reacting directly between said tension pulleys to urge either of said tension pulleys towards the other independently of the movement of the other; and a weight for developing such force and sustained by said connections.

12. The combination of a pair of pulleys and a slack driving belt running thereon, of a belt tensioning device comprising an upper tension pulley and a lower tension pulley, one engaging the outer face of the upper and the other the outer face of the lower run of said belt adjacent one of the first named pulleys, mounted for independent movements toward and from each other, the weight of the upper pulley and its guiding means acting in a belt tightening direction, and the weight of the lower pulley and its guiding means acting in a belt slackening direction; and a cable and weight acting upon said tension pulleys to urge the same independently toward each other, and against the belt.

13. The combination with a pair of pulleys and a slack driving belt running thereon, of a belt tightening device comprising an upper tension pulley and a lower tension pulley, one engaging the outer face of the upper and the other the outer face of the lower run of said belt adjacent one of the first named pulleys, said tension pulleys, mounted for independent movements toward and from each other; and means including a flexible tension member extending between the pulleys, and a weight for stressing the same, for applying to each of said tension pulleys a force of substantially constant value, said tension pulleys being so mounted and connected that upon a reversal of the belt a movement of one of said tension pulleys in a belt slackening direction tends to urge the other of said tension pulleys in a belt tightening direction.

14. In combination, a pair of pulleys and a belt adapted to run on said pulleys in either direction, two tension pulleys mounted for independent movements engaging opposite runs of said belt on the outside of the same, and a common means including a flexible tension member extending between the pulleys, and a weight for stressing the same, for continuously applying a force of substantially constant value to each of said tension pulleys to urge the same towards each other, said pulleys being so mounted and connected that the movement of one upon reversal tends to impart movement to the other of said tension pulleys.

In testimony whereof we have signed our names to this specification.

WILLIAM SYLVESTER BUNKER.
GEOFFREY LEONARD HANSCOM.